H. J. SEWELL.
CUSHION WHEEL.
APPLICATION FILED AUG. 22, 1914.

1,166,548.

Patented Jan. 4, 1916.

Fig. 1ª

WITNESSES
Robert N. Van Bokito
Virginia C. Spratt.

INVENTOR
Herbert J. Sewell
BY Ralzemond A. Parker
ATTORNEY

UNITED STATES PATENT OFFICE.

HERBERT J. SEWELL, OF HIGHLAND PARK, MICHIGAN.

CUSHION-WHEEL.

1,166,548.  Specification of Letters Patent.  Patented Jan. 4, 1916.

Application filed August 22, 1914. Serial No. 858,011.

*To all whom it may concern:*

Be it known that I, HERBERT J. SEWELL, a citizen of the United States, residing at Highland Park, county of Wayne, State of Michigan, have invented a certain new and useful Improvement in Cushion-Wheels, and declare the following to be a full, clear, and exact description of the same, such as will enable others skilled in the art to which it pertains to make and use the same, reference being had to the accompanying drawings, which form a part of this specification.

This invention relates to cushion wheels.

It has for its object a peculiar form of sheathing for the cushioning device.

Figure 1:
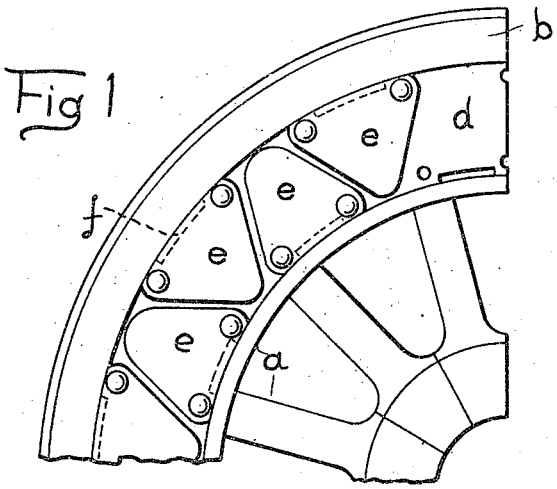
Figure 2:
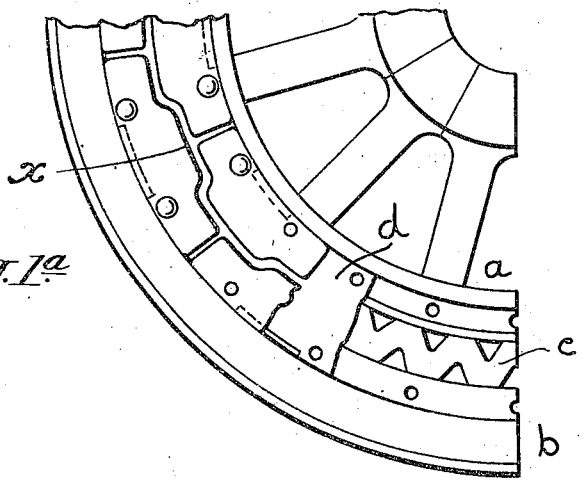
Figure 2:
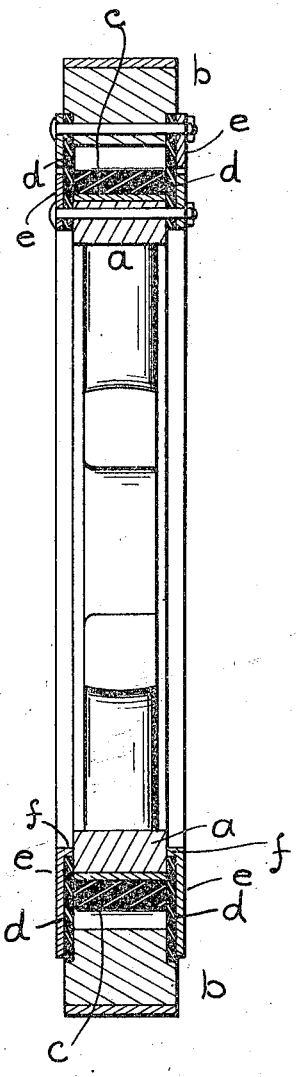
Figure 3:
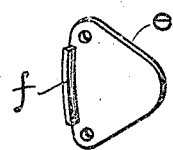

In the drawings,—Figure 1, is a side elevation of part of a wheel showing one form of my invention, Fig. 1ª is a side elevation of a part of a wheel and partly broken away, showing another form of my invention. Fig. 2, is a vertical cross-section of a wheel having the triangular shield pieces shown in Fig. 1. Fig. 3, is a perspective view of one of the triangular shield pieces.

$a$ designates the inner wheel part, $b$ the outer wheel part. These are spaced in normal concentric relation preferably by a zig-zag rubber strip $c$ which permits the two wheel parts to assume eccentric relation with respect to each other, but immediately after the shock is over has a tendency to return the parts to relative concentric position. It will, however, be understood that when the wheel is in operation, the two wheel parts are never in exactly concentric relation due to the weight of the load upon the inner wheel part that will cause the inner wheel part to move closer to the outer wheel part near the bottom. The rubber rings $d$ act not only to assist the zig-zag strip in the yielding resistance between the outer and inner wheel parts but also serve to completely exclude mud, water and other foreign substances from getting between the wheel parts and interfering with the spreading of the portions of the zig-zag rubber strip $c$. The rings $d$ may be made of pure rubber or combination of rubber and some other material. These rubber rings $d$ may be protected from abrasion by the triangular plates $e$ (shown in Fig. 1) which also resist lateral displacement of the wheel parts and cushioning devices and prevent its destructive effects. These plates $e$ are substantial triangles. They are spaced slightly from each other along their two sides, this spacing permitting but also limiting the possible eccentric relative movement of the two wheel parts. It will be observed that each triangular plate has a wide base for fastening to the wheel part that carries it, while the unfastened part is comparatively narrow and that they are alternately attached to the outer and inner wheel parts. Each shield plate is provided with a lip $f$ adapted to fit in a notch of the flexible ring $d$.

In Fig. 1ª I have shown a modified form of shield plates. The shields on the one wheel part are staggered with respect to the shields on the other wheel part and each is provided with a central extension $x$ which opposes the two meeting ends of the shields on the other wheel part and fits into the concavity formed by them. This forms a zig-zag space exposing the rubber ring $d$. It will be readily understood that by changing the arrangement of the shield pieces by moving each one along the distance between the bolt holes the exposure on the rubber ring $d$ will be shifted and hence the wear will be more uniform. This same shifting is possible with the triangular pieces.

One of the main features of improvement in the two forms of shield plates shown in the drawings is the arrangement of the plates so that the shield plates on one wheel part protrude farther toward the other wheel part thereby forming a large surface to prevent the lateral displacement of the wheel parts with respect to each other. For instance with the triangular shield plates, these plates extend from one wheel part to the other so as to be of almost a positive preventive of lateral displacement of the wheel parts, yet allowing them relative movement and not requiring the shielding devices to overlap, but allowing them to all remain in the same plane on one side of the well. With the modified form of shield plates shown in Fig. 1ª, the extensions $x$ provide a greater amount of surface to grip the cushioning members and thereby prevent lateral displacement of the two wheel parts. Inasmuch as the zig-zag strip is a continuous member there is little tendency for lateral displacement by reason of the lateral bearing of the shield parts against this member at different points which might be the case with the cushioning member made up of small sections as has been done in the prior art.

What I claim is:

1. A resilient wheel, having in combination, an inner wheel part, an outer wheel part, cushioning devices spacing the two wheel parts, shield plates disposed in substantially the same plane, some being fastened to only one wheel part and some fastened to only the other wheel part, the said shield plates fastened to one wheel part extending beyond but spaced from the shield plates fastened to the other wheel part and the said shield plates engaging against the cushioning devices and serving to prevent lateral displacement of the two wheel parts, substantially as described.

2. A resilient wheel, having in combination, an inner wheel part, an outer wheel part, cushioning devices spacing the two wheel parts, a plurality of shield plates disposed in substantially the same plane, each shield plate secured to only one wheel part and the shield plates alternating in being secured to the one wheel part and the other wheel part, the alternating shield plates extending radially beyond each other and spaced from each other to allow relative movement of the two wheel parts and engaging against the cushioning devices to prevent lateral displacement of the two wheel parts, substantially as described.

3. A resilient wheel, having in combination, an inner wheel part, an outer wheel part, cushioning devices spacing the two wheel parts, shield plates disposed in substantially the same plane and at the side of the cushioning devices, some being fastened to only one wheel part and some being fastened to only the other wheel part, the said shield plates fastened to the one wheel part extending to overlapping relation with the other wheel part and the shield plates fastened to the latter wheel part extending into overlapping relation with the former wheel part, the individual shield plates fastened to one wheel part being spaced from the individual shield plates fastened to the other wheel part, substantially as described.

4. A resilient wheel, having in combination, an inner wheel part, an outer wheel part, cushioning devices spacing the two wheel parts, triangular shield plates located in substantially the same plane at each side of the cushioning devices and alternately inverted, each shield plate secured to only one wheel part at its base but overlapping the other wheel part at its apex, the said shield plates being spaced from each other to allow relative movement between the wheel parts, substantially as described.

In testimony whereof, I sign this specification in the presence of two witnesses.

HERBERT J. SEWELL.

Witnesses:
  VIRGINIA C. SPRATT,
  AGNES M. HIPKINS.